(12) United States Patent
Gearhart et al.

(10) Patent No.: US 7,329,197 B2
(45) Date of Patent: Feb. 12, 2008

(54) SELF-ALIGNING PULLEY, GEAR OR OTHER ROTATIONAL MEMBER

(76) Inventors: Robert M. Gearhart, 27944 Peach Orchard Rd., Easton, MD (US) 21601; Donald N. Clark, 1131 Indian Summer Point, Chapin, SC (US) 29036; Kraig A. Clark, 5 Stonewall Ct., Irmo, SC (US) 29063

( * ) Notice: Subject to any disclaimer, the term of this patent is extended or adjusted under 35 U.S.C. 154(b) by 69 days.

(21) Appl. No.: 11/256,884

(22) Filed: Oct. 24, 2005

(65) Prior Publication Data
US 2007/0093330 A1 Apr. 26, 2007

(51) Int. Cl.
*F16H 7/10* (2006.01)
(52) U.S. Cl. .................................................... 474/112
(58) Field of Classification Search .............. 254/390; 474/101, 112, 133, 135, 148, 166, 199
See application file for complete search history.

(56) References Cited

U.S. PATENT DOCUMENTS

| | | | |
|---|---|---|---|
| 1,819,334 A * | 8/1931 | North ........................ | 474/183 |
| 1,982,141 A * | 11/1934 | Nault ........................ | 464/151 |
| 2,279,887 A | 4/1942 | Hathorn ..................... | 254/190 |
| 2,421,685 A | 6/1947 | Crot et al. ................... | 308/18 |
| 3,251,235 A | 5/1966 | Cederberg et al. ........... | 74/240 |
| 3,757,959 A * | 9/1973 | Thompson et al. ......... | 212/271 |
| 4,068,907 A | 1/1978 | Zenthoefer .................. | 308/18 |
| 4,372,435 A * | 2/1983 | Bradbury ................. | 198/369.4 |
| 4,747,810 A | 5/1988 | Shepley et al. ............. | 474/135 |
| 5,180,342 A | 1/1993 | Van Ee ...................... | 474/123 |
| 5,616,107 A | 4/1997 | Simonson .................... | 482/97 |
| 6,811,506 B2 | 11/2004 | Prior et al. ................. | 474/199 |
| 2005/0070388 A1 | 3/2005 | Miyata ...................... | 474/199 |

* cited by examiner

*Primary Examiner*—Vicky A. Johnson
(74) *Attorney, Agent, or Firm*—Larry J. Guffey

(57) ABSTRACT

An improved alignable pulley or sheave assembly includes: (a) a shaft having a rotational axis and an exterior surface which has a portion that is spherically shaped, (b) a pulley having a perimeter and a central opening with an interior surface that is configured so as to allow the pulley to be mounted on shaft's spherical shaped portion, and (c) a means for locking the shaft and pulley together such that they rotate together while also enabling the pulley to tilt from side to side with respect to a plane that lies perpendicular to the shaft's rotational axis.

3 Claims, 6 Drawing Sheets

SELF-ALIGNING PULLEY, GEAR OR OTHER ROTATIONAL MEMBER

BACKGROUND OF THE INVENTION

1. Field of the Invention

This invention relates to pulleys, gears and other rotational members and the means for attaching them to their shafts so that they have the ability to move and align themselves when the driving force that is applied to the rotational member's perimeter is not always in the same direction. For example, when this force is not always directed exactly perpendicular to the shaft's rotational axis.

2. Description of the Related Art

In assorted machines or mechanical drive systems where cables are operated over pulleys, sheaves or other rotational members, it has always been difficult to align and mount these members so as to insure a continuing, perfect alignment between the cable and the rotating member. Even slight misalignment can yield cable chafing on the rotational member and result in undue wear at the affected contact points of such systems and the creation of undesirable noise in the use of such systems.

This situation often results in the system having to be shut down while realignment is attempted or replacement parts are installed. Additionally, it can increase the danger of cable failure which could have dire consequences for those that work in the vicinity of such systems or depend on the reliability of their operation.

In addition to such maintenance and safety considerations, these systems also suffer from the limitation of having very little flexibility is the manner in which such systems can be designed. Because of the need for the precise alignment of the components of such systems (i.e., a pulley, gear, etc. must be mounted at right angles to the shaft on which it is mounted, and the plane defined by a belt, chain, cable, etc. running on the perimeter of such a member must coincide with the plane of the member), the positioning of these elements can often require more space for mounting than is ideal, especially if one is trying to minimize the space consumed by such systems.

Various alignable pulleys and the means for mounting standard pulleys so as to make them self-aligning have been suggested. For example, see U.S. Pat. Nos. 2,279,887, 2,421,685 and 6,811,506.

Despite this prior art, further improvements appear to be needed as there still exist many type of mechanical equipment (e.g., power mowers) that utilize such systems and which experience greater than acceptable amounts of downtime to maintain and repair such systems.

3. Objects and Advantages

There has been summarized above, rather broadly, the prior art that is related to the present invention in order that the context of the present invention may be better understood and appreciated. In this regard, it is instructive to also consider the objects and advantages of the present invention.

It is an object of the present invention to provide an improved self-aligning pulley or sheave assembly.

It is an object of the present invention to provide a means for mounting a pulley or sheave on its shaft that will enable such rotational members to continually realign themselves as necessary to compensate for changes in the direction of the forces that are being applied to their perimeters.

It is also an object of the present invention to provide an improved self-aligning pulley or sheave assembly that will allow for the dynamic positioning of such a member on its drive shaft.

It is an object of the present invention to provide an improved self-aligning pulley or sheave that will allow for such a member to reposition itself on its drive shaft so as to always stay in proper alignment.

It is yet another object of the present invention to provide an improved self-aligning pulley or sheave assembly that is ideally suited for use in both manual and power mower applications.

It is a further object of the present invention to provide a means for significantly reducing the downtime necessary to maintain and repair mechanical equipment that utilizes cable and pulley/sheave systems.

It is also an object of the present invention to provide an alignable pulley or sheave that is reliable and simple and inexpensive to manufacture and maintain.

These and other objects and advantages of the present invention will become readily apparent as the invention is better understood by reference to the accompanying summary, drawings and the detailed description that follows.

SUMMARY OF THE INVENTION

Recognizing the need for the development of improved alignable pulleys and sheaves, the present invention is generally directed to satisfying the needs set forth above and overcoming the disadvantages identified with prior art devices and methods.

In accordance with the present invention, an improved alignable pulley or sheave assembly includes: (a) a shaft having a rotational axis and an exterior surface which has a portion that is spherically shaped, (b) a pulley having a perimeter and a central opening with an interior surface that is configured so as to allow the pulley to be mounted on shaft's spherical shaped portion, and (c) a means for locking the shaft and pulley together such that they rotate together while also enabling the pulley to tilt from side to side with respect to a plane that lies perpendicular to the shaft's rotational axis.

In a first embodiment this locking means includes a planar groove in the shaft's spherical shaped portion, and a member that attaches to the pulley and whose distal end extends into the groove so as to restrict the movement of the pulley so that it and its shaft rotate together while allowing only for the tilting of the pulley.

In a second embodiment this locking means includes a push bar having two ends which rigidly attached to the shaft on the pulley's opposite sides. The central section of this bar is oriented parallel to the shafts axis and at a prescribed radial distance therefrom, and configured so that it passes through an off-center opening in the pulley and engages with this opening so as to cause the pulley and shaft to rotate together while allowing for the pulley's tilting.

In a third embodiment this assembly can further include a pair of stops, one of each being attached to the shaft on the opposite sides of the shaft's spherical shaped portion. The facing sides of these stops are configured so as to restrict the tilt of the pulley to be less than a prescribed maximum tilt angle.

In another embodiment, this self-aligning pulley assembly includes: (a) a shaft having a rotational axis and an exterior surface that has a segment with a groove that extends for a prescribed length, parallel to the shaft's axis, (a) a pulley having a perimeter and a central opening which has an interior surface configured so as to allow the pulley to be mounted on the shaft's exterior surface, and (c) a means for locking the shaft and pulley such that they rotate together while also enabling the pulley to move axially on the shaft for a distance that is proportional to the groove's length.

Thus, there has been summarized above, rather broadly, the present invention in order that the detailed description that follows may be better understood and appreciated. There are, of course, additional features of the invention that will be described hereinafter and which will form the subject matter of the claims to this invention.

DESCRIPTION OF THE PREFERRED EMBODIMENT

Figure 1:
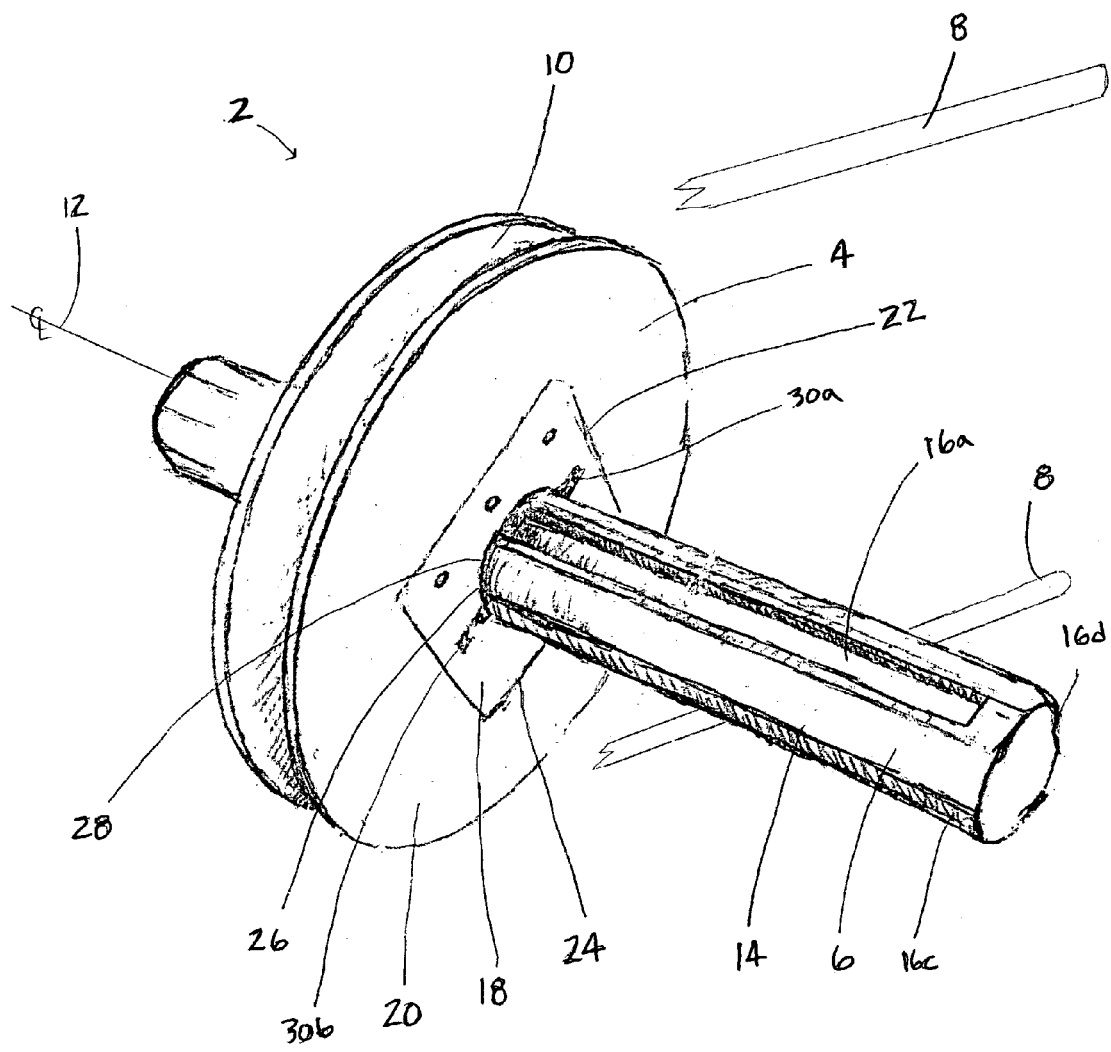
FIG. 1 shows a perspective view of a first preferred embodiment of the present invention.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Figure 2:
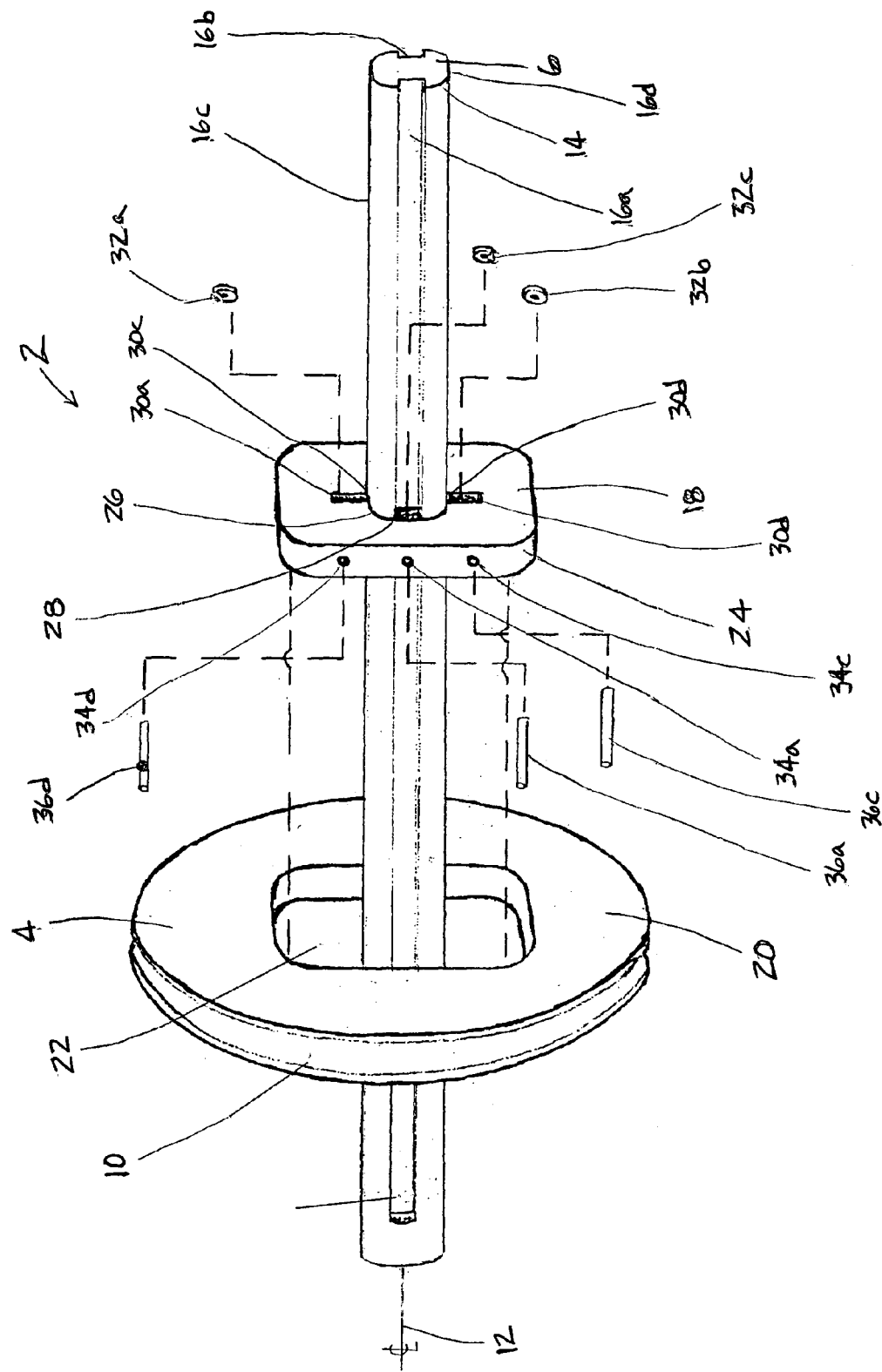
FIG. 2 shows an exploded view of the embodiment shown in FIG. 1.

FIG. 1 shows a perspective view and FIG. 2 shows an exploded view of a first preferred embodiment of the present invention. The self-aligning and self-positioning pulley assembly 2 shown in these figures is constructed in such a manner that it allows a pulley 4 to move axially so as to realign itself on its shaft 6 when there is misalignment and the plane which defines the forces exerted by a cable 8 on the pulley's perimeter 10 is not exactly perpendicular the shaft's centerline 12.

The shaft 6 in this assembly 2 is seen to have a rotational axis or centerline and an outer circumferential surface 14 which is not circular in cross-section. It 14 has two segments on opposite sides of the surface, with each having a groove 16a, 16b that extends parallel to the shaft's centerline or axis. Rotated approximately ninety degrees on either sides of these grooves 16a, 16b are two additional sections that are characterized by having flat (although any non-circular shaped would suffice) portions 16c, 16d. These serve to prevent the pulley 4 from rotating on the shaft 6.

The pulley 4 in this assembly 2 is seen to consist of inner 18 and outer 20 members. The outer 20 pulley member has a perimeter 10 that is configured for contact with the cable 8 that wraps around it. This member 20 also has a central opening 22 that is configured to mate and lock with the perimeter 24 of the inner pulley member 18.

The inner pulley member 18 has a central opening 26 which has an interior surface 28 that is generally configured so as to allow it to attach to the shaft 6. This interior surface 28 includes flat portions 30c, 30d that mate with the shaft's flat portions 16c, 16d. These portions also include cavities 30a, 30b that serve to provide a means for mounting a rolling member, bearing or other means 32a, 32b for promoting relative axial motion between the pulley and the shaft.

On the portions of the inner pulley member interior surface 28 that are adjacent to the shaft's grooves are radial bores 34a, 34b that extend from this member's interior surface 28 to its perimeter 24. Each of these two bores serve to provide for the insertion into these bores of the proximate end of a pin 36a, 36b that is used to mount in the shaft's respective grooves an additional rolling member, bearing or other means 32c, 32d that is further used for promoting relative axial motion between the pulley and the shaft. Such additional bores 34c, 34d and pins 36c, 36d may also be used to aid in mounting the axial motion promoting means 32a, 32b that are used adjacent the shaft's flat portions 16c, 16d.

As shown in FIG. 1, after the assembly of all these various parts of the inner pulley member, it and the outer member are fixed together. Many well-known means exist for tying such members together and any of these means may be used in the present invention.

The pulley of this assembly can be seen to have the ability to axially realign itself on its shaft so as to realignment itself in response to changes in the direction at which the cable that acts upon the outer pulley member's perimeter.

Figure 3:
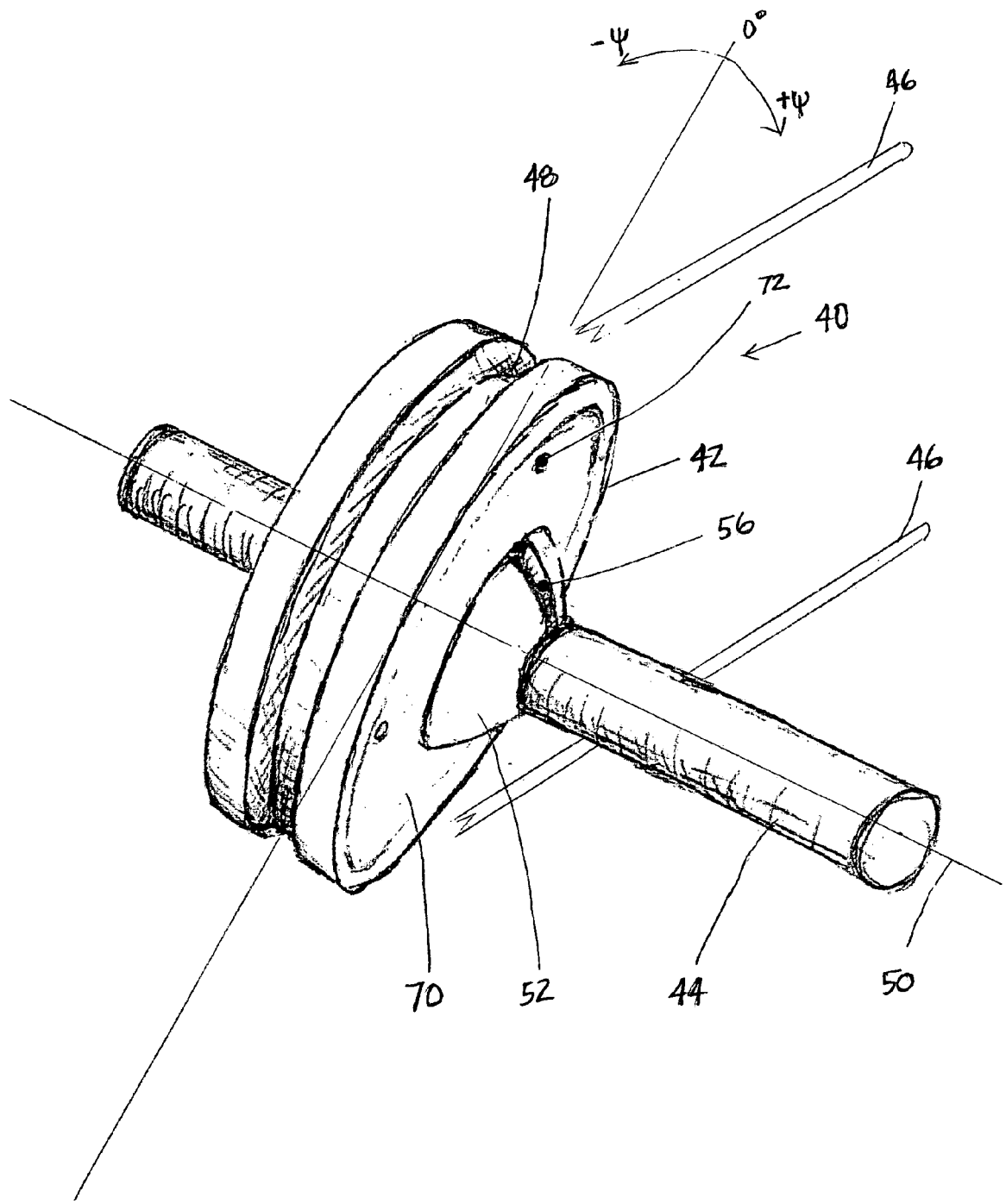
FIG. 3 shows a perspective view of a second preferred embodiment of the present invention.
Figure 4:
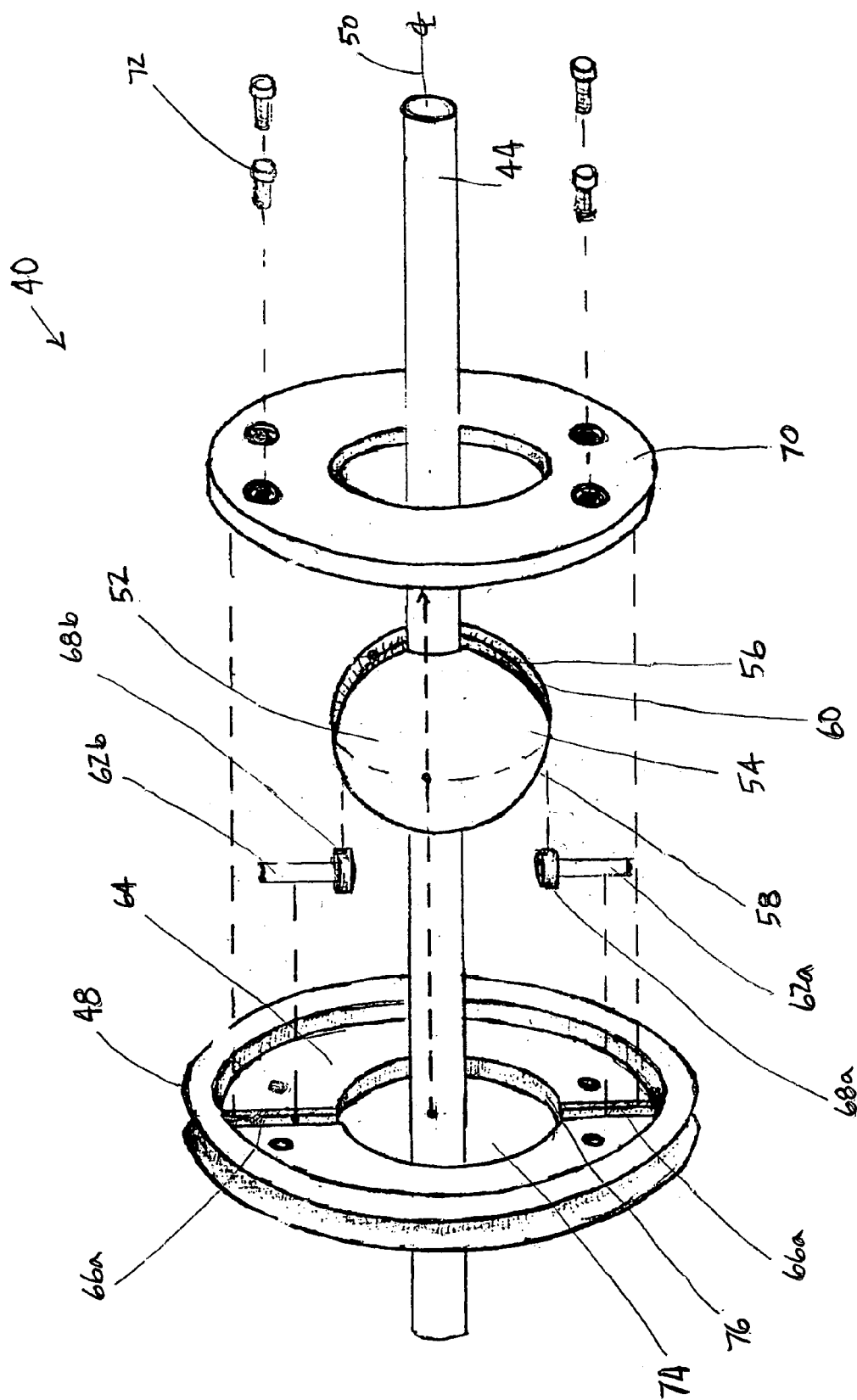
FIG. 4 shows an exploded view of the embodiment shown in FIG. 3.

FIGS. 3 and 4 show, respectively, a perspective and an exploded view of a second preferred embodiment of the present invention. The self-aligning pulley assembly 40 shown in these figures is constructed in such a manner that it allows a pulley 42 to lean right or left, at an angle $\psi$, on its shaft 44 when there is misalignment and the plane which defines the forces exerted by a cable 46 on the pulley's perimeter 48 is not perpendicular (i.e., $\psi$=0 degrees) to the shaft's centerline 50.

This assembly's shaft 44 is generally cylindrical except for a portion 52 which has an exterior surface 54 that is essentially sphere-shaped and on which the pulley is mounted. This portion has a planar groove 56 on its perimeter 58 whose interior surface 60 aligns with the shaft's centerline in the sense that a plane passing through this centerline can be oriented such that when it passes through the groove the plane's intersection points with the groove will form two complementary and continuous arc sections that lie on opposite sides of the shaft's centerline. This groove 56 is used to mount on opposite sides of the sphere two rolling members, bearings or other means 62a, 62b which serve to lock the pulley 42 and shaft 44 together such that they always rotate together even as the pulley 42 is allowed to tilt right or left with respect to a plane that is perpendicular to the shaft's centerline 50.

These members 62a, 62b are radially mounted on the pulley's centerline by constructing the pulley such that one 64 of its faces has along a diameter two radial slots 66a, 66b which are configured so as to mount these members such that their distal ends 68a, 68b can be extended down into the shaft's sphere-like portion's groove 56. A disc 70 with a central opening and appropriate locking devices 72 are used to hold the members 62a, 62b in these slots.

The pulley has a central opening 74 that is configured to accommodate the pulley's mounting on the shaft's spherical portion 52. A closer look at a cross-sectional view of this opening 74 would reveal that its interior surface 76 has a radius of curvature that is only slightly larger than that of the spherical portion 52. Thus, as the pulley tilts right or left, this opening's interior surface 76 is always in close proximity to the spherical portion's exterior surface 54.

For those applications in which only a certain maximum angle of tilt, $\psi_{max}$, can be tolerated, one can mount stops on either side of the shaft's spherical portion and configure these stops such that their facing sides are tilted with respect to the shaft's axis at this maximum allowable tilt, $\psi_{max}$.

Figure 5:
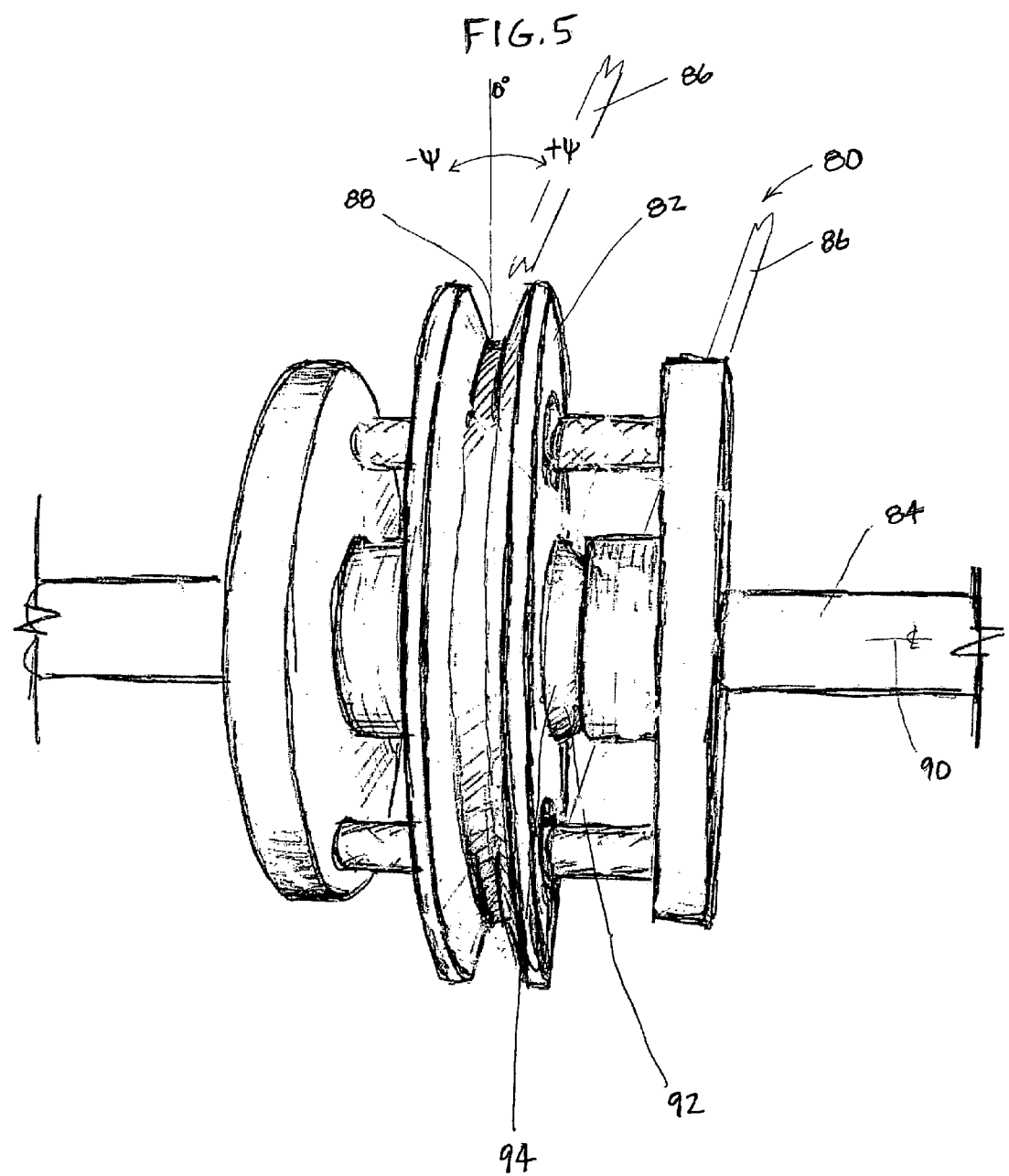
FIG. 5 shows a perspective view of a third preferred embodiment of the present invention.
Figure 6:
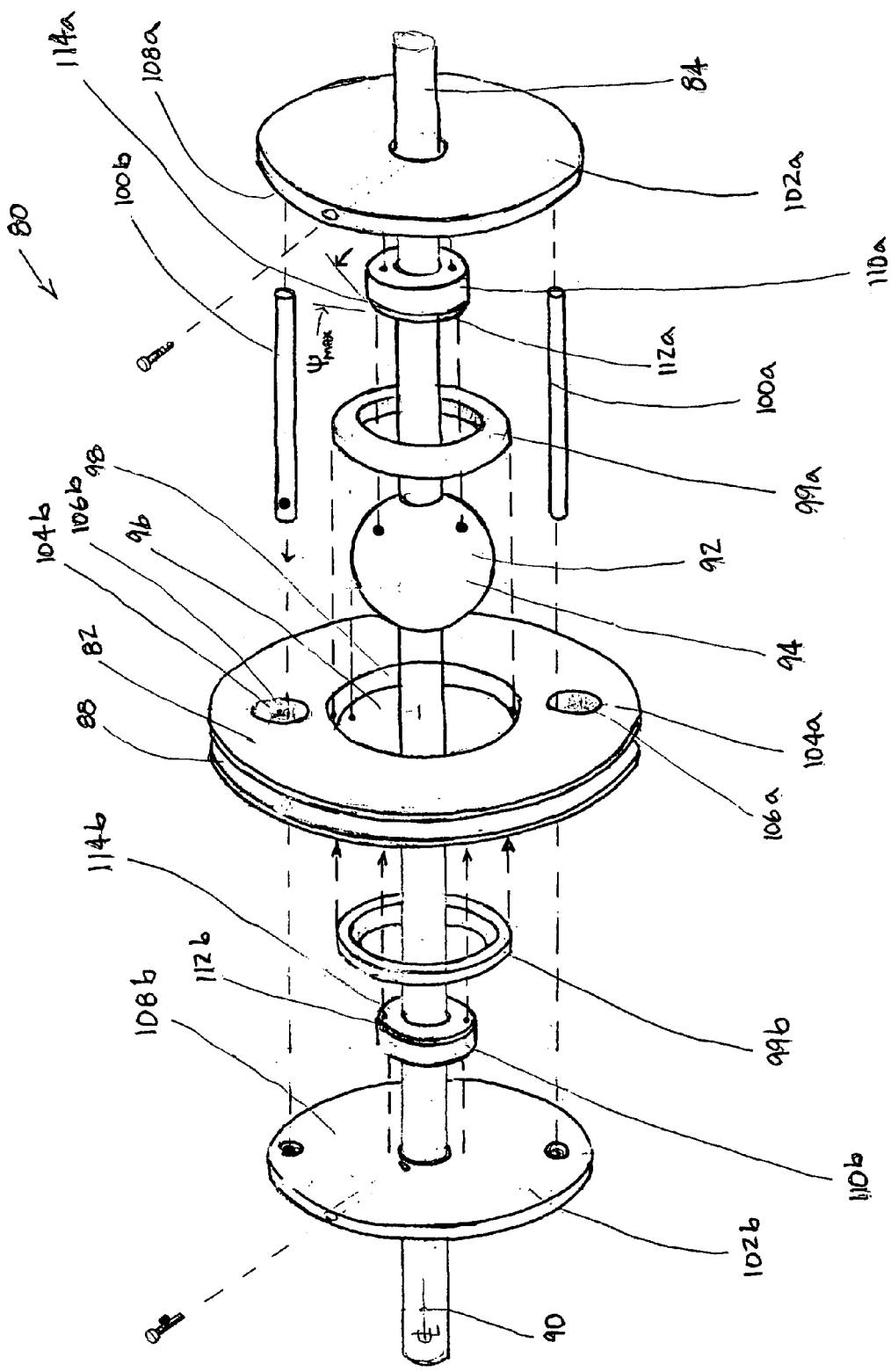
FIG. 6 shows an exploded view of the embodiment shown in FIG. 5.

FIGS. 5 and 6 show, respectively, a perspective and an exploded view of a third preferred embodiment of a self-aligning pulley assembly 80 which is also constructed in such a manner that it allows a pulley 82 to lean right or left, at an angle $\psi$, on its shaft 84 when there is misalignment and the plane which defines the forces exerted by a cable 86 on the pulley's perimeter 88 is not perpendicular (i.e., $\psi=0$ degrees) to the shaft's centerline 90.

This embodiment is similar to that shown in FIGS. 3-4, but uses a different means for locking the pulley and shaft so that they rotate together. This assembly's shaft 84 is generally cylindrical except for a portion 92 which has an exterior surface 94 that is essentially sphere-shaped and on which the pulley is mounted.

The pulley has a central opening 96 that is configured to accommodate the pulley's mounting on the shaft's spherical portion 92. This opening's interior surface 98 has a radius of curvature that is only slightly larger than that of the spherical portion 92. Thus, as the pulley tilts right or left, this opening's interior surface 98 continues to be in close proximity to the spherical portion's exterior surface 94. Various means (bearings, rollers, etc.) may be added to this interior surface to promote the smooth, binding-free motion between the pulley and the shaft's spherical portion on which it is mounted. When using such means, it is often found to be useful to use some type of guards 99a, 99b which are located at the edges of this opening 96 so as to prevent dirt and other foreign material from hindering the smooth relative motion between these parts.

The pulley and its shaft are made to rotate together by two push bars 100a, 100b that are rigidly mounted so that each of them lies parallel to the shaft's centerline and on its opposite sides at a specified radial distance from this centerline. The bars are held in these positions by connecting their ends to two disc 102a, 102b which are rigidly mounted on the shaft 84 and at an equidistance from the edges of the shaft's spherical portion 92.

The pulley has two openings 104a, 104b which are located so as to allow the bars 100a, 100b to pass thru the pulley 82. The interior surfaces 106a, 106b of these opening are especially configured with appropriate angles of curvature so as to not allow the pulley to tilt so much as to allow the pulley to come in contact with the adjoining faces 108a, 108b of the bar-mounting discs 102a, 102b.

Also illustrated in this embodiment is an example of the use of the previously mentioned stops 110a, 110b which are mounted on either side of the shaft's spherical portion 92 and configured such that a portion 112a, 112b of their facing sides 114a, 114b are tilted with respect to the shaft's axis at a maximum allowable tilt angle, $\psi_{max}$ The foregoing is considered as illustrative only of the principles of the invention. Further, since numerous modifications and changes will readily occur to those skilled in the art, and because of the wide extent of the teachings disclosed herein, the foregoing disclosure should not be considered to limit the invention to the exact construction and operation shown and described herein. Accordingly, all suitable modifications and equivalents of the present disclosure may be resorted to and still considered to fall within the scope of the invention as hereinafter set forth in the claims.

We claim:

1. A self-aligning pulley assembly that is caused to rotate by the temporarily varying and occasionally misaligned forces exerted by a cable which acts on said assembly, wherein said cable is defined to be misaligned when the plane of the forces exerted by said cable lies at a herein defined angle $\psi$ to the plane that is perpendicular to the resulting rotational axis of said assembly, said assembly comprising:
   a shaft having a rotational axis and an exterior surface, said shaft exterior surface having a portion that is spherically shaped,
   a pulley having a perimeter and a central opening, said opening having an interior surface configured so as to allow said pulley to be mounted on said shaft portion having said spherical shaped exterior surface,
   a means for locking said shaft and said pulley together such that they rotate together while also enabling said pulley to tilt from side to side at a said angle $\psi$ under the temporarily varying action of said cable, and
   wherein said assembly is given said self-aligning property by further configuring said pulley such that there is absent any other structural piece in contact with said pulley which could restrain said tilting motion of said pulley.

2. The self-aligning pulley assembly as recited in claim 1, wherein said means including:
   a planar groove in said shaft's spherical shaped portion that is oriented such that the plane defined by said groove intersects with said shaft centerline, and
   a member having a distal and a proximate end, said proximate end attached to said pulley at a point that lies above said groove and said member distal end extending into said groove so as to restrict the movement of said pulley so that said pulley and said shaft rotate together while allowing for the tilting of said pulley.

3. A self-aligning rotational assembly that is in driving contact with a drive element that moves so as to define a plane of drive motion of said drive element and wherein the tilting orientation of said plane is temporarily varying and is occasionally misaligned with respect to a plane that is perpendicular to the rotational axis of said assembly, and wherein said misalignment is measured by a herein defined angle $\psi$, said assembly comprising:
   a shaft having a centerline and an exterior surface which includes a portion that is spherically shaped,
   a rotational member having a perimeter and a central opening, said opening having an interior surface configured so as to allow said member to be mounted on said shaft portion having said spherical shaped exterior surface,
   a means for locking said shaft and said member together such that they rotate together while also enabling said member to tilt from side to side at a said angle $\psi$ under the temporarily varying action of said drive element, and
   wherein said assembly is given said self-aligning property by further configuring said member such that there is absent any other structural piece in contact with said member which could restrain said tilting motion of said member.

* * * * *